July 6, 1954            H. C. MAY            2,682,784
POWER AND BRAKE CONTROLLER
Filed June 29, 1950            2 Sheets-Sheet 1
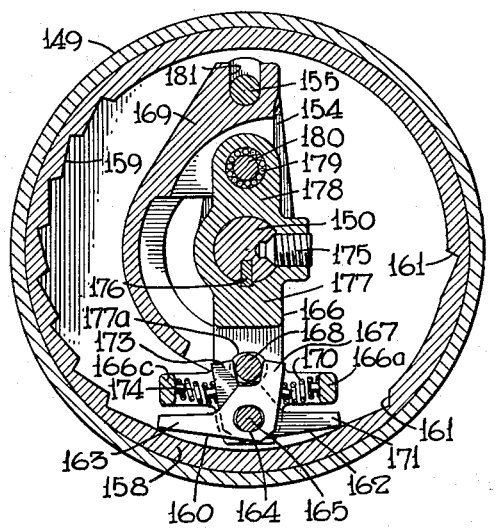
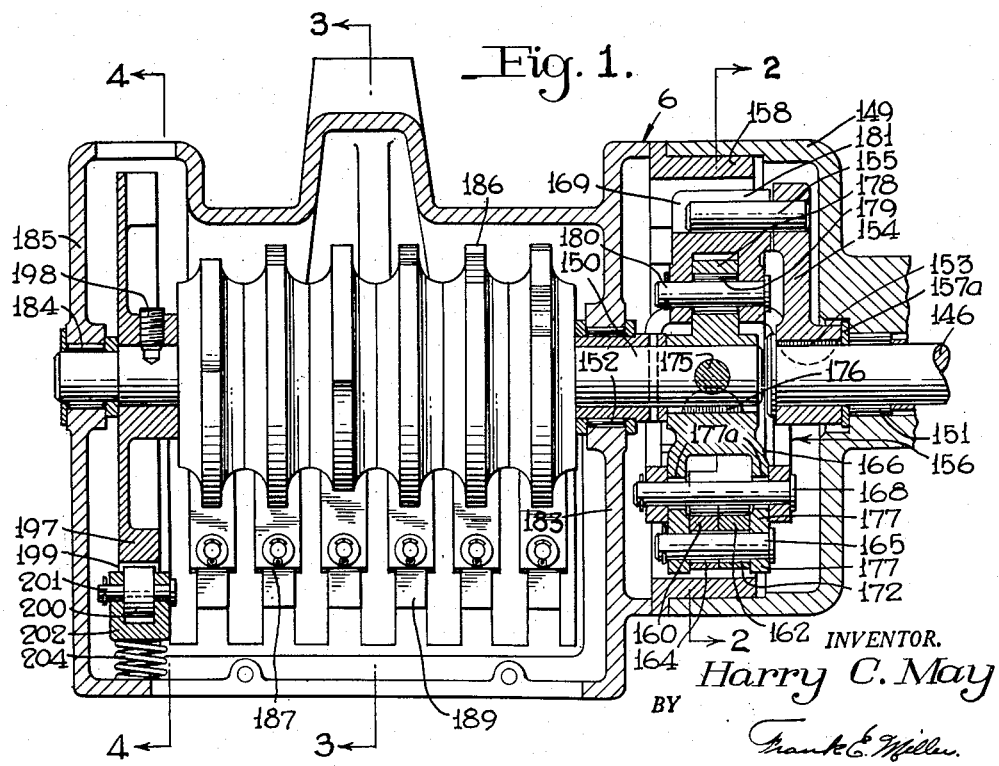
INVENTOR.
Harry C. May
BY
Frank E. Miller
ATTORNEY INVENTOR.
Harry C. May
BY
Frank E. Miller
ATTORNEY Patented July 6, 1954

2,682,784

UNITED STATES PATENT OFFICE 2,682,784

POWER AND BRAKE CONTROLLER

Harry C. May, East McKeesport, Pa., assignor to Westinghouse Air Brake Company, a corporation of Pennsylvania Application June 29, 1950, Serial No. 171,078

10 Claims. (Cl. 74—565)

1

This invention relates to power and brake controllers and more particularly to apparatus for selectively controlling the speed of operation of diesel propulsion engines and also dynamic braking on diesel electric railway locomotives.

The principal object of the invention is the provision of a multiple position operator's controller for selectively controlling by electrical means the speed of operation of a prime mover, such as a diesel engine, on a diesel-electric railway locomotive and also for selectively controlling by electrical means the degree of propulsion power exerted by said prime mover or the degree of dynamic braking on said locomotive by combined electrical and pneumatic means.

Another object is the provision of a manually operative controller of the above type embodying mechanical means for introducing a delay action for limiting the degree of increase in propulsion power to a preselected amount until a responsive reverse manipulation of the handle is made.

Another object is the provision of a manually operative controller of the above type embodying mechanical means for introducing a delay action for limiting the degree of increase in dynamic braking to a preselected amount until a responsive reverse manipulation of the handle is made.

Other objects and advantages will be apparent from the following more detailed description of the invention.

Figure 3:
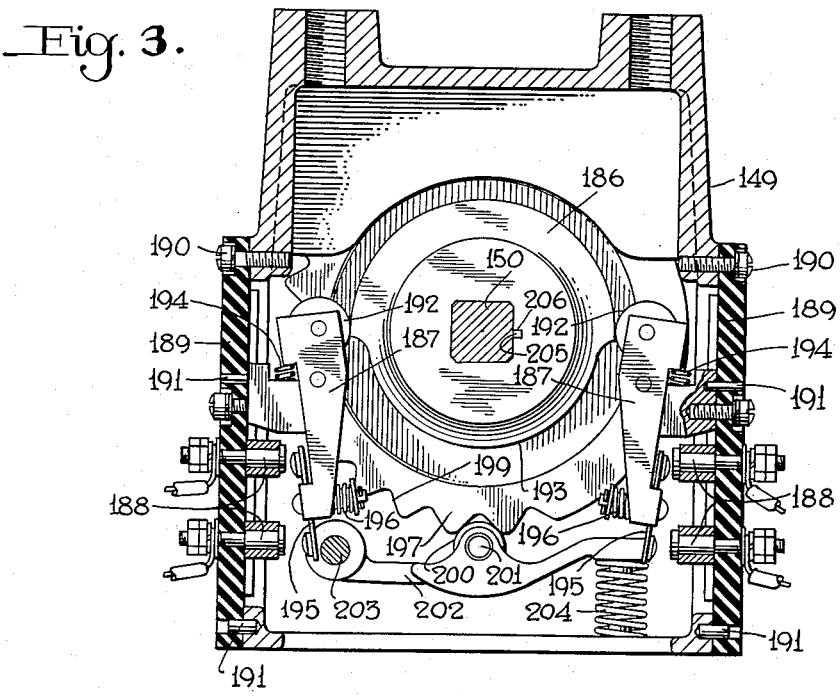
Figure 4:
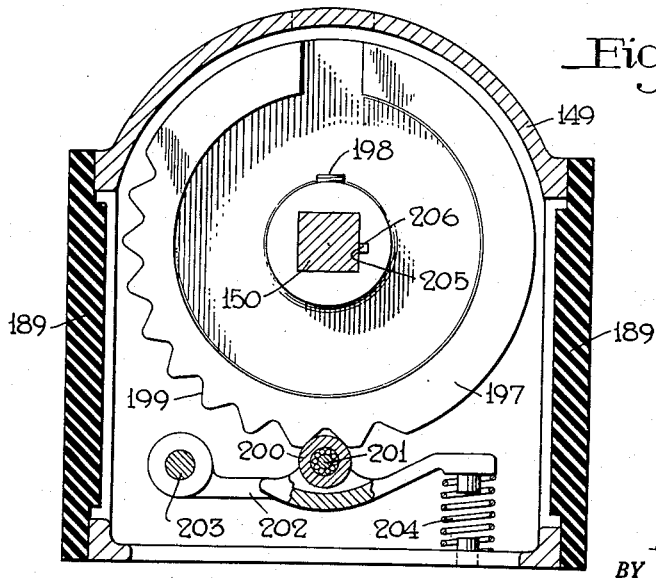

In the accompanying drawings, Fig. 1 is an enlarged sectional view of a portion of a controller embodying the invention, and Figs. 2, 3 and 4 are sectional views taken substantially on lines 2—2, 3—3 and 4—4 respectively.

Description

The rotary controller mechanism 6 comprises a casing 149 having a driving shaft 146 and a controller operating shaft 150 rotatably mounted in coaxial alignment therein by means of a pair of bearings 151 and a pair of bearings 152, 194, respectively. On the end of the operating shaft 146 opposite that on which the pinion 145 is mounted there is rigidly mounted by means of a key 153 an arm 154 extending radially outward from said shaft. Rigidly mounted to the outer end of the arm 154 is a pin 155 extending in a direction away from said arm and parallel to the axis of the driving shaft 146 to make an operative connection with a stepping or latching mechanism 156. A bearing washer 157a is located on the end of the shaft 146 between the casing 149 and the arm 154.

2

As shown in Figs. 1 and 2 of the drawings, the stepping mechanism 156 comprises an annular portion or rack 158 fixedly mounted in a portion of the casing 149 and having on its inner periphery a row of teeth 159 for detaining engagement with a pawl 160 to restrict the rate of increase in propulsion to a step-by-step change in propulsion control. The annular portion 158 is also provided on its inner periphery with teeth 161 for engagement with a pawl 162 for restricting the rate of increase of braking power at certain stages. The pawl 160 comprises an arm 163 extending towards the teeth 159 and is provided at the base of said arm with an opening 164 through which a pin 165, mounted in a carrier member 166, extends for supporting said pawl, the opening 164 being elongated in the direction of the arm 163 so as to permit rocking and shifting movement of the pawl relative to the pin and vice versa, for a purpose to be more fully explained later. The pawl 160 further comprises an arm 167 extending substantially radially from opening 164 at an angle to the arm 163 and adapted to make contact with a pin 168 secured in one end of an actuating element or link 169 for controlling the movement of the pawl 160 relative to the carrier member 166 and to the rack 158. Interposed between the arm 167 and a portion 166a of the carrier member 166 is a spring 170 which biases the pawl 160 in a direction for engaging the teeth 159 and the pin 168.

The pawl 162 comprises an arm 171 extending towards the teeth 161 and is provided at the base of said arm with an opening 172 (Fig. 1), through which the pin 165 likewise extends for supporting the pawl, the opening 172 being elongated in the direction of the arm 171 for similar purposes to that of pawl 160. The pawl 162 further comprises an arm 173 extending radially at an angle to the arm 171 and adapted to make contact with the pin 168 at the side opposite to that of arm 167 of pawl 160. A spring 174 similar to spring 170 is interposed between the arm 173 and another portion 166c of the carrier member 166 which spring biases the pawl 162 in a direction for engaging the teeth 161 and the pin 168.

The carrier member 166 (Figs. 1 and 2) constituting a part of the stepping mechanism 156, is rigidly secured to the controller operating shaft 150 by means of a set-screw 175 and a semi-circular key 176. The downwardly extending portion 177 of the carrier member 166 through which the pin 165 extends is bifurcated and intermediate the pin 165 and shaft 150 is provided with a pair of matched elongated openings 177a (Fig. 1) extending in a direction substantially parallel to that of the openings 164 and 172 in the pawls 160 and 162, respectively. In an upwardly extending arm 178 of member 166 diametrically opposite to the bifurcated portion 177 there is provided a ball bearing 179 for reception of a pin 180 secured at either end in the actuating element or link 169 for rockably supporting said link.

The link 169 is provided at the top (Fig. 2) with a round-bottomed channel 181 which accommodates pin 155 in close-fitting engagement, the pin, as has been noted, being rigidly secured to the outer end of the arm 154. The link 169 is formed in the shape of a bow, substantially bridging the shaft 150 with one end mounted on pin 180 and with the opposite end carrying the pin 168, at the side of shaft 150 adjacent the pin 165. The link 169 has two matching parallel sides which slidably engage two opposite outer surfaces of the arm 178 of the carrier member 166 and are journaled on the pin 180, while the opposite side of shaft 150 said sides are disposed one at either side of arm 177 of member 166 and carry the pin 168.

As shown in Fig. 1 and above described, the controller operating shaft 150 is rotatably supported adjacent its one end in the bearing 152 mounted in a suitable opening in a wall 183 of the casing 149 and at its other end is supported in a bearing 184 mounted in a suitable opening in an outer wall 185 of casing 159. Intermediate its ends the shaft 150 is of squared cross-section, having mounted thereon in interlocked relation a plurality of rotary cams 186 having central openings of squared shape corresponding to the cross-section of the operating shaft. Each cam 186 is adapted to operate a pair of oppositely arranged contact fingers 187 into and out of contact with respective fixed contact members 188 (Fig. 3) according to the contour of the rotary cam. The contact fingers 187 at each side of the plurality of cams 186 are hinged, in spaced substantially parallel relation to each other, to a supporting board 189 of insulating material secured to the casing 149 by means of headed screws 190 in positions determined by dowel-pins 191.

As will be seen in Fig. 6, each contact finger 187 is provided at one end with a roller 192 that engages the peripheral edge of the respective rotary cam 186. When one of the rollers 192 engages in a depressed portion 193 of the peripheral edge of the cam 186, a spring 194 becomes effective to actuate the contact finger 187 into contact with the respective pair of the fixed contact members 188. When the roller 192 engages the outer rim or edge of the cam 186, the respective finger 187 is shifted out of contact with the respective fixed contact members 188. A yielding contact tip 195 having an associated bias spring 196 is provided on each contact finger 187 in the manner shown so that the contact tip may close a circuit between the respective pair of fixed contact members 188 without the necessity of electric current passing through the contact finger 187 itself.

The specific contour of the rotary cams 186 and the relative angular position of one to the other is such that the contact fingers 187 are actuated into and out of bridging contact with the respective stationary contact members 188 in the proper sequence in connection with manipulation of a handle (not shown) to provide the desired propulsion or braking control in either a forward or reverse direction of motion of the locomotive.

The various operating positions of the controller shaft 150, and consequently of the rotary cams 186 and the carrier member 166 secured thereto, are positively defined by means of a disc 197 (see Figs. 3 and 4) fixed to a squared portion of the shaft by means of a set-screw 198 and having suitable notches 199 in the peripheral edge thereof for receiving a roller 200, which roller is rotatably mounted by means of a bearing 201 on a lever 202 and yieldably biased into contact with the peripheral edge of the disc 197 by a spring 204. The lever 202 is pivoted at one end on a suitable stud 203 secured in the casing 149 in parallel relation to the controller shaft 150, and is operatively engaged at the other end by the coil spring 204 interposed between a wall of the casing 149 and the lever end.

In order to insure the disc 197 being fitted over the operating shaft 150 in one position only, a pin 205 is provided in a side of said shaft 150 which extends into a suitable groove or slot 206 formed in the central opening of the disc 197. Thus the disc is prevented from being installed in improper angular relation to the controller shaft 150.

*Operation*

In operation, when the operator rotates the shaft 146, said shaft acts through the medium of the attached arm 154 and pin 155 upon the upper end of link 169 to rock the link in a clockwise direction, as viewed in Fig. 2 about the pin 180 mounted in carrier member 166, moving the pin 168 secured in the lower end of the link against the pressure of bias spring 174 acting on arm 173 of pawl 162, into contact with the left-hand ends of the openings 177a in the lower portion 177 of the now stationary carrier member 166. This motion of pin 168 relative to carrier member 166 permits spring 170 to shift pawl 160 toward the left until the pawl at the right-hand end of the opening 164 engages the right-hand side of pin 165 and thereafter urges the pawl to rotate counter-clockwise about pin 165 and toward engagement with rack 158. Further clockwise movement of the link 169 causes rotation of member 166 in the same direction, carrying the pawl 160 to the left along the inner periphery of the annular rack 158 until arm 163 of pawl 160 engages the first of the teeth 159.

During the preceding action the disc 197 which is fixed to the shaft 150, is rotated in a counter-clockwise direction, as viewed in Fig. 4, causing the roller 200 to ride outward on the hump between the first notch 199 and notch 199 immediately to the left against the pressure of spring 204 acting on lever 202. After the pawl 160 passes the halfway point in its travel toward the first tooth 159, the roller is past the peak of said hump and spring 204 then actuates the roller inward to the bottom of the next notch 199, thereby causing the shaft 150 and member 166 to complete the first step of rotation in a direction for increasing propulsion power. This movement of member 166 is sufficient to carry pin 165 to the left-hand end of opening 164 in pawl 160 and also increase the force of spring 170 acting on said pawl by further compressing the spring between portion 166a and the pawl. At this time all the motion just described, including that of the handle 64 is interrupted.

During the operation just described, the disc 197, being rigidly secured to the shaft 150, is rotated through the same angle as the cam members 186 which is sufficient to locate the second notch 199 from the right hand (Fig. 4) above the spring-pressed roller 200 by which the shaft is held stationary while the operation now about to be described takes place.

As has just been noted, the rotation of shaft 150 is slightly out of phase with rotation of shaft 146 due to the lost motion connection between link 169 and carrier member 166 until they are in phase at the end of the first step of propulsion increase. However, at the end of first step of rotation of shaft 150 the pressure of opposing springs 170 and 174 is unbalanced in a direction for shifting the pawls to the left, due to the lost motion connection between the carrier member 166 and the pawls.

At this time, in order to further increase the propulsion power the operator must now reverse the rotation of the shaft 146 a sufficient distance to disengage the pawl 160 from the first tooth 159 before the pawl may be advanced to the second tooth 159 and the handle 64 advanced to marking "2" on the guide plate 62 in the forward propulsion zone. Counter-clockwise movement of the shaft 146 and arm 154 attached thereto may be effected in a manner just the reverse of that previously described. The resulting counter-clockwise movement of the link 169 relative to the now stationary shaft 150 and member 166 causes pin 168 to rock pawl 160 in a clockwise direction about pin 165, which is now disposed at the left-hand end of opening 164, moving the outer end of arm 164 inward until it is clear radially of the apex of the first tooth 159, whereupon spring 170 prevails over spring 174 and propels said pawl end past the first tooth into a position from which it may be actuated into engagement with the second tooth. The various parts of the stepping mechanism 156 are now in the same position relative to each other as those shown in Fig. 5, but, displaced angularly to positions adjacent the first of teeth 159.

Upon resuming clockwise movement of shaft 146 and link 169 in a clockwise direction (Fig. 2) carries the pin 168 toward the left away from arm 167 of the pawl 160, thereby permitting spring 170 to shift the pawl 160 to the left and to rotate it counter-clockwise on pin 165 into position for repeating the operation described in connection with the pawl 160 engaging the first tooth. With pin 165 disposed at the right-hand end of opening 164 and pin 168 disposed at the left-hand end of openings 177a, the link 169 rotates the member 166 clockwise, which member carries the pawl 160 into collision with the second tooth 159 and then moves pin 165 to the left-hand end of opening 164 and further compresses spring 170. At this time, roller 200 will be resting in the next notch 199 to the left (Fig. 4) in disc 197. Upon reverse motion of link 169, pin 168 rotates pawl 160 out of engagement with second tooth 159, whereupon over-energized spring 170 projects the pawl past the apex of the second tooth.

This stepping operation may be repeated until the desired degree of propulsion power is obtained, or until the shaft 146 is in position for effecting maximum propulsion power.

When it is desired to reduce the degree of propulsion power, the handle may be moved opposite to that just described.

In the return movement, however, there will be no stepping, or latching, interruptions, since the contours of the teeth 159 are such as to permit the pawls 160 and 162 to ride over the teeth without operatively engaging them.

It being understood that the peripheral surfaces of the cams 186 are formed in such contour and relative position as to control the operation of the contact fingers 187 in the opening and closing of certain of the electrical circuits through the various stationary contacts 188 in the proper sequence to effect the desired propulsion control, it is deemed that the specific function of the contact fingers 187 is unnecessary to a clear understanding of the present invention.

Movement of the handle into the braking zone actuates the link 169 and thereby the pawl 162 in a counter-clockwise direction as viewed in Fig. 2 in a manner similar to that described in connection with propulsion control operation. The pawl 162 continues moving in a counter-clockwise direction until the tip of the arm 171 engages the first of the teeth 161, thereby interrupting movement of handle 64.

As previously described in connection with controlling propulsion, the controller shaft 150 will be held stationary by the positioning action of the roller 200 in the extreme right-hand notch 199 of the disc 197. The handle may then be moved in reverse and thereby the link 169 may be moved in a clockwise direction as viewed in Fig. 2 which, due to a lost-motion action between pawl 162 and member 166, and between said member and link 169, similar to that described between pawl 160 and the link, over-energizes spring 174 causing the tip of the arm 171 to be drawn radially inward from the rack 158 until the arm 171 clears the apex of the tooth 161 and spring 174 propels said arm past said tooth. Following this, further advancement of the handle into the braking zone with a consequent proportional increase in braking power may be continued until the pawl 162 engages, or collides with, the second tooth 161. At this point, the associated equipment is conditioned to provide maximum braking power and further advancement of the handle is prevented by the last mentioned engagement.

*Summary*

It will thus be seen that I have provided a combined braking and propulsion controller for controlling by manipulation of a single handle the braking and propulsion of a diesel locomotive in either a forward or reverse direction. The controller is further provided with several novel detaining means for preventing undesired movement of the handle out of "neutral" and "off" positions and for preventing manipulation of the handle in an undesirably hasty manner.

Having now described my invention, what I claim as new and desire to secure by Letters Patent, is:

1. An actuating mechanism comprising a rotary operating shaft, driving means for rotating said shaft, a stationary rack disposed in an arc of a circle about the axis of said shaft, latching means mounted on said shaft adapted to cooperate with said rack to limit the rotation of said shaft in a certain direction to the distance from one tooth to another tooth at any one time, said latching means comprising a carrier member rigidly attached to said shaft having two diametrically opposite arms, a pawl rockably and shiftably mounted on one of said arms, resilient means mounted on said member urging said pawl toward engagement with said rack to limit movement of said member in said certain direction with said shaft, said latching means being actuable by said driving means in said one direction to rotate said shaft in said certain direction and in the opposite direction to rotate relative to said shaft while said shaft remains stationary and to actuate said pawl out of engagement with one tooth of said rack and to rock said pawl clear of said tooth for advancement to the next tooth, and yieldable means to restrain said shaft from rotation relative to said rack when said pawl is adjacent a tooth of said rack.

2. An actuating mechanism comprising a rotary operating shaft, driving means for rotating said operating shaft, a stationary toothed rack, latching means mounted on said shaft adapted to cooperate with said rack to limit continuous rotation of said shaft in a certain direction to a certain degree, said latching means comprising a carrier member fixed on said shaft, a pawl rockably and shiftably mounted on said carrier member, resilient means biasing said pawl toward operative engagement with said rack, a link pivotally mounted on said member rockable by said driving means in one direction to rotate said member and thereby said shaft in said certain direction until stopped by said pawl engaging a tooth on said rack, and yieldable means operable to restrain said shaft from rotation relative to said rack when said pawl is adjacent a tooth of said rack, said link being rockable by said driving means in the opposite direction to actuate said pawl out of engagement with one tooth of said rack and to rock said pawl clear of said tooth for advancement to the next tooth of said rack.

3. An actuating mechanism comprising a rotary operating shaft, driving means for rotating said operating shaft, a stationary rack, latching means mounted on said shaft adapted to limit the rotation of said shaft in a certain direction to step-by-step degrees, said latching means comprising a carrier member fixed on said shaft having two diametrically opposite arms, a pawl rockably and shiftably mounted on one of said arms, resilient means biasing said pawl toward operative engagement with said rack, and a link rockably mounted on said member operable by said driving means in one direction to actuate said member and said shaft in said certain direction until stopped by said pawl engaging a tooth on said rack, yieldable means operable to restrain said shaft from rotation relative to said rack when said pawl is adjacent a tooth of said rack, said link having a lost motion connection with said member and operative by said driving means when said pawl is in engagement with a tooth in a direction opposite to said one direction to actuate said pawl out of engagement with said one tooth and to rock said pawl clear of said tooth for advancement to the next tooth.

4. An actuating mechanism comprising a rotary operating shaft, driving means for rotating said operating shaft, a stationary toothed rack disposed in an arc of a circle about said shaft, latching means mounted on said shaft adapted to limit rotation of said shaft in a certain direction to step-by-step degrees, said latching means comprising a carrier member fixed on said shaft having two diametrically opposite arms, a pawl rockably and shiftably mounted on one of said arms, resilient means biasing said pawl toward operative engagement with said rack, a link rockably mounted on said member operable by said driving means in one direction to actuate said member and said shaft in said certain direction until stopped by said pawl engaging a tooth on said rack, yieldable means operable to restrain said shaft from rotation relative to said rack when said pawl is adjacent a tooth of said rack, said link having a lost motion connection with said member and operative relative to said member by said driving means when said pawl is in engagement with a tooth in a direction opposite to said one direction to actuate said pawl out of engagement with and clear of said one tooth for advancement to the next tooth.

5. An actuating mechanism comprising a rotary operating shaft, a stationary toothed rack, means mounted on said shaft adapted to engage one tooth of said rack to limit the degree of continuous rotary movement of said shaft in a certain direction, said means comprising a carrier member having two diametrically opposite arms, a pawl rockably mounted on one of said arms and shiftable transversely relative to said member, resilient means urging said pawl to rock in a direction for engaging one tooth of said rack to prevent further movement of said member in said certain direction, a link rockably mounted intermediate its ends on the other of said arms and adapted to extend from one arm to the other arm of said member, spanning said operating shaft, a pin fixed in the end of said link adjacent said pawl in axially parallel relation to said shaft for effecting a loose connection between said link and said member for actuating said pawl out of engagement with said one tooth within the limits of said loose connection, actuating means engaging the opposite end of said link, and means for restraining said shaft from motion while said link rotates on said member in a direction for rocking said pawl out of locking engagement with said one tooth, thereby conditioning the first mentioned means for advancement to the next tooth adjacent said one tooth upon resuming movement of said shaft in said one direction.

6. A controller device comprising a rotary operating shaft, driving means for rotating said operating shaft, a stationary rack disposed in an arc of the circle about said shaft, stepping means operatively connecting said driving means to said shaft to limit the continuous rotation of said shaft in a certain direction to an angle corresponding to the distance from one tooth to another at a time, said stepping means comprising a carrier member rigidly mounted on said shaft having two diametrically opposite arms, a pawl rockably mounted on one of said arms and shiftable thereon transversely of said member, resilient means mounted on said member urging said pawl toward engagement with said rack to limit the movement of said member in a direction corresponding to that of said shaft in said certain direction, a link rockably mounted intermediate its ends on the other of said arms and having a lost motion connection at one end to said one arm and a positive connection at the other end to said driving means, said link being operative in response to movement of said driving means in a direction opposite to that of said shaft in said certain direction to actuate said pawl out of engagement with a tooth of said rack in preparation for advancement of said pawl to the next tooth in said rack while taking up the lost motion between said link and said member, and yieldable means for restraining rotation of said shaft while said link rocks on said member in a direction opposite to that corresponding to said certain direction for disengaging said pawl from a tooth of said rack.

7. A controller device comprising a rotary operating shaft, driving means for rotating said operating shaft, a stationary rack disposed in an arc of the circle about said shaft, stepping means operatively connecting said driving means to said shaft to limit the continuous rotation of said shaft in a certain direction to an angle corresponding to the distance from one tooth to another at a time, said stepping means comprising a carrier member rigidly mounted on said shaft having two diametrically opposite arms, a pawl rockably mounted on one of said arms and shiftable thereon transversely of said member, resilient means mounted on said member urging said pawl toward engagement with said rack to limit the movement of said member in a direction corresponding to that of said shaft in said certain direction, a link rockably mounted intermediate its ends on the other of said arms and having a lost motion connection at one end to said one arm and a positive connection at the other end to said driving means, said link being operative in response to movement of said driving means in a direction opposite to that of said shaft in said certain direction to actuate said pawl out of engagement with a tooth of said rack in preparation for advancement of said pawl to the next tooth in said rack while taking up the lost motion between said link and said member, and yieldable means for restraining rotation of said shaft while said driving means and said link rock relative to said member.

8. A controller device comprising a rotary operating shaft, actuating means having a first lost motion connection with said shaft, resilient means operatively engaging said shaft and adapted to be energized during take-up of lost motion in said connection upon initial movement of said actuating means in a certain direction and to later bias said shaft in a direction to rotate with said actuating means in said certain direction, a rack disposed adjacent said shaft, pawl means loosely mounted on said shaft for cooperation with said rack for limiting continuous movement of said actuating means in said certain direction to the space between two adjacent teeth on said rack, said resilient means being operative after movement of said actuating means in said certain direction to advance said shaft relative to said actuating means a distance corresponding to said space between two adjacent teeth, and a second resilient means normally biasing said pawl means for operative engagement with said rack and over-energized for advancing the pawl means past the obstructing tooth upon movement of said actuating means in a direction opposite to said certain direction to rock said pawl means away from the obstructing tooth.

9. A controller device comprising a rotary operating shaft, actuating means having a lost motion connection with said shaft, one resilient means operatively engaging said shaft and normally positioning a portion of said actuating means in the middle of said lost motion, a rack disposed adjacent said shaft, pawl means having a lost motion connection with said shaft for operative engagement with said rack and said actuating means to limit the continuous movement of said actuating means and said shaft in said certain direction, and other resilient means normally positioning a portion of said shaft in the middle of the latter lost motion for biasing said pawl toward operative engagement with said rack upon initial movement of said actuating means in said certain direction and operative to eliminate said latter lost motion in the direction of the next advanced tooth in said rack so as to increase the bias in said certain direction when said latter lost motion is increased by engagement of said pawl means with said tooth, said actuating means being operative upon movement in the opposite direction to said certain direction to actuate said pawl means out of engagement with said rack against the bias of said second resilient means to permit the second resilient means to actuate said pawl means past said tooth in said certain direction.

10. A controller device comprising a rotary operating shaft, actuating means having a lost motion connection with said shaft, one resilient means operatively engaging said shaft and normally positioning a portion of said actuating means rotatively in the middle of said lost motion and adapted to take up the lost motion at one side upon initial movement of said actuating means in a certain direction and to later restore the normal relation of said portion to said shaft, pawl means having a lost motion connection with said shaft for operative engagement with said rack and said actuating means to limit the continuous movement of said actuating means and said shaft in said certain direction to a distance corresponding to the distance between two adjacent teeth of said rack, and other resilient means normally positioning a portion of said shaft in the middle of the latter lost motion for biasing said pawl toward operative engagement with said rack upon initial movement of said actuating means in said certain direction and operative to eliminate said latter lost motion in the direction of the next advanced tooth on said rack so as to increase the bias toward said tooth or in said certain direction when said latter lost motion is taken up by engagement of said pawl means with said tooth, said actuating means being operative upon movement in the opposite direction in said certain direction to take up the first mentioned lost motion in the opposite direction and actuate said pawl means out of engagement with said rack against the bias of said second resilient means to permit the latter to actuate said pawl means past said tooth in said certain direction.

References Cited in the file of this patent

UNITED STATES PATENTS

| Number | Name | Date |
|---|---|---|
| 815,578 | Brown | Mar. 20, 1906 |
| 977,073 | Cubitt | Nov. 29, 1910 |
| 1,440,438 | Bennitt | Jan. 2, 1923 |
| 1,548,764 | Sloane | Aug. 4, 1925 |
| 1,794,234 | Le Francois | Feb. 24, 1931 |
| 1,826,079 | Locke | Oct. 6, 1931 |
| 1,901,886 | Adam | Mar. 21, 1933 |
| 2,369,690 | Roth | Feb. 20, 1945 |
| 2,392,700 | Sanborn | June 8, 1946 |

FOREIGN PATENTS

| Number | Country | Date |
|---|---|---|
| 260,409 | Great Britain | Nov. 4, 1926 |